United States Patent [19]

Lacko et al.

[11] Patent Number: 4,462,958
[45] Date of Patent: Jul. 31, 1984

[54] LMFBR FUEL ASSEMBLY DESIGN FOR HCDA FUEL DISPERSAL

[75] Inventors: Robert E. Lacko, North Huntingdon; Roger W. Tilbrook, Monroeville, both of Pa.

[73] Assignee: The United States of America as represented by the United States Department of Energy, Washington, D.C.

[21] Appl. No.: 373,469

[22] Filed: Apr. 30, 1982

[51] Int. Cl.³ .............................................. G21C 3/28
[52] U.S. Cl. .................................. 376/420; 376/412; 376/428; 376/435; 376/172
[58] Field of Search ............... 376/412, 420, 435, 172, 376/173, 428

[56] References Cited

U.S. PATENT DOCUMENTS

| | | | |
|---|---|---|---|
| 2,998,367 | 8/1961 | Untermyer | 376/435 |
| 3,125,493 | 3/1964 | D'Amore | 376/420 |
| 3,260,649 | 7/1966 | Jens et al. | 376/420 |
| 3,274,067 | 9/1966 | Greebler et al. | 376/420 |
| 3,351,532 | 11/1967 | Raab, Jr. et al. | 376/173 |
| 3,396,078 | 8/1968 | Visner | 376/173 |
| 3,573,169 | 3/1971 | Gumuchian | 376/435 |
| 3,658,643 | 4/1972 | Spenke | 376/172 |
| 3,679,545 | 7/1972 | Leirvik | |
| 3,748,230 | 7/1973 | Gerosa et al. | |
| 3,912,583 | 10/1975 | Iljunin et al. | 376/172 |
| 4,123,326 | 10/1978 | Shinbo | |
| 4,125,433 | 11/1978 | Iljunin et al. | 376/435 |

FOREIGN PATENT DOCUMENTS 52-50498  4/1977  Japan .................................. 376/435

*Primary Examiner*—Harvey E. Behrend

[57] ABSTRACT

A fuel assembly for a liquid metal fast breeder reactor having an upper axial blanket region disposed in a plurality of zones within the fuel assembly. The characterization of a zone is dependent on the height of the axial blanket region with respect to the active fuel region. The net effect of having a plurality of zones is to establish a dispersal flow path for the molten materials resulting during a core meltdown accident. Upward flowing molten material can escape from the core region and/or fuel assembly without solidifying on the surface of fuel rods due to the heat sink represented by blanket region pellets.

3 Claims, 8 Drawing Figures

LMFBR FUEL ASSEMBLY DESIGN FOR HCDA FUEL DISPERSAL

GOVERNMENT CONTRACT

This invention was conceived during performance of a contract with the United States Government designated DE-AM02-76CH94000.

BACKGROUND OF THE INVENTION

This invention relates to an improved design for fuel assemblies for liquid metal fast breeder reactors (LMFBR).

One of the accidents for which an LMFBR plant must be analyzed is the Hypothetical Core Disruptive Accident (HCDA). This accident involves a grossly disrupted core in which a substantial amount of nuclear fuel and cladding has melted. The nuclear fuel of an LMFBR is normally cooled by an upward flow of liquid coolant, usually sodium, over the surface of the fuel rods. During an HCDA, it is considered possible that the movement of the molten cladding may form blockages which reduce the potential for permanent removal of fuel from the core region, i.e. bottling-up the core, and consequent permanent sub-criticality.

It is desired to provide a fuel assembly design which reduces or eliminates the potential for cladding or fuel freezing and consequent plugging or bottling-up of the core region.

SUMMARY OF THE INVENTION

A fuel assembly design for an LMFBR has been developed in which the location of axial blanket regions and fission gas plenums in individual fuel rods and moreover the axial elevation in the fuel rods as distributed over the fuel assembly provides a fuel dispersal flow path in the axial direction such that a molten material disposal path is provided.

DESCRIPTION OF THE PREFERRED EMBODIMENT

Figure 1:
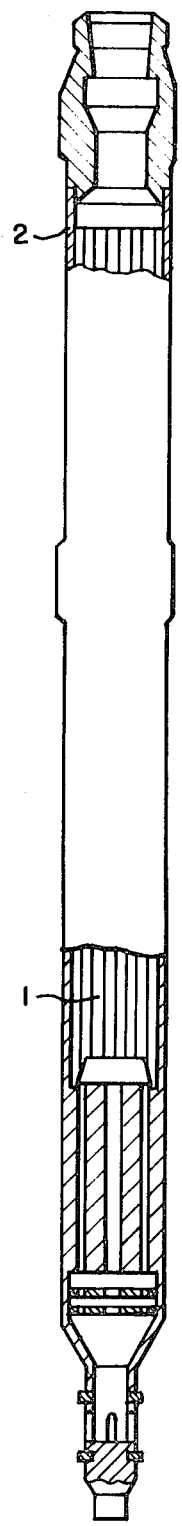
FIG. 1 is a profile schematic of an LMFBR fuel assembly.
Figure 3:
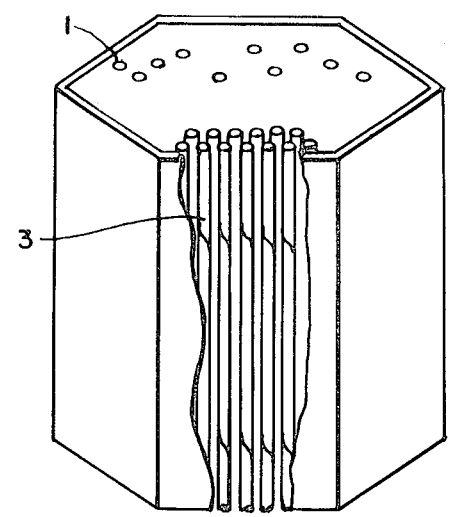
FIG. 3 is a section taken as indicated from FIG. 1.
Figure 2:
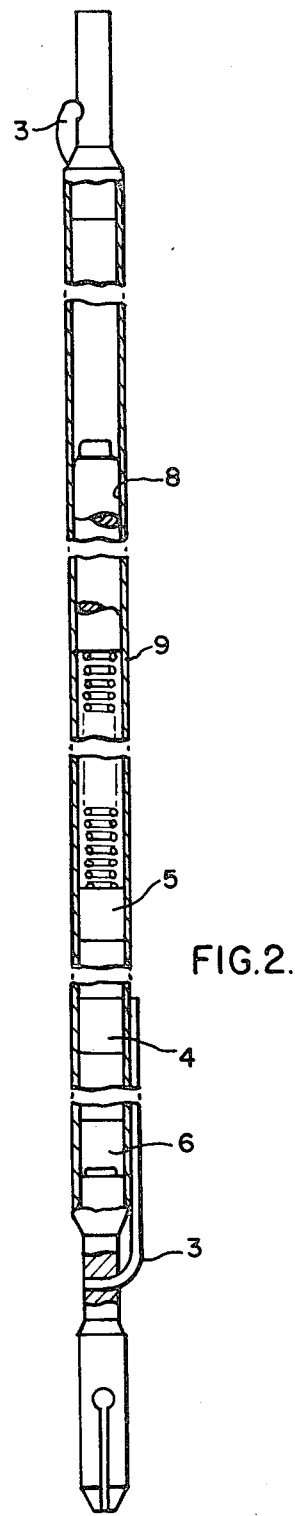
FIG. 2 is a profile schematic of a single fuel rod for an LMFBR fuel assembly typical of current designs.

FIG. 1 is an illustration of a fuel assembly for an LMFBR of typical design. A fuel assembly is in general a grouping of fuel rods 1, one of which is illustrated in FIG. 2. The fuel rods 1 are gathered in an array which is surrounded by a duct 2 which serves to channel and direct coolant flow over the surface of rods 1. Spacing between rods 1 in the array is maintained by a wire 3 wrapped around each individual rod 1 as indicated by FIG. 3 or such spacing may be established and maintained by egg-crate-like and/or honeycomb grids, not shown in the drawings.

The gaps between fuel rods 1 are restricted due to the existence of the wire-wrap or due to the spacer grids. Very little room exists for coolant flow. During an HCDA, molten fuel and molten cladding material are dispersed via fission gas pressures or fuel or steel vapor pressures induced by a core power burst. One path for removal of this material is upward along the normal coolant flow path within the fuel subassembly within duct 2. The ability of molten core materials to penetrate through the fuel rod 1 array is very important to the early termination of the accident. If sufficient removal does not occur, the accident will progress into phases which can result in re-criticality conditions and subsequent additional power bursts. The course of the accident is crucially dependent on the nature of the steek or fuel blockage at the top of the core. Should molten materials freeze on the surface of the fuel rods 1, plugging of the flow path is a possibility. The fuel assembly could become completely closed or bottled, preventing the escape of molten materials.

It appears that in order to reduce or eliminate the potential for molten material freezing and plugging, the flow path must be enlarged or a method must be found to prevent freezing.

Refer to FIG. 2. Within each fuel rod 1 is a stack of pellets; a central section of this stack is the core 4 consisting of fuel pellets 12 made of fissile fuel material. An upper region consists of non-fuel material intended to breed fissile fuel. This region called the upper axial blanket 5 contains material which contains predominantly fertile material formed as blanket pellets 13. A lower region called the lower axial blanket 6 also contains fertile material as blanket pellets 13. Both blanket regions generally operate at lower temperatures than the fuel pellets 12 since the fission reaction which produces core power occurs in the fissile fuel. The stack of pellets, both blanket and fuel pellets, is generally held together by a spring mechanism 7. Inside the spring and above the stack of pellets is a fission gas plenum 8.

When molten fuel or molten cladding material moves upward outside the fuel rod cladding 9, along a fuel rod, it tends to freeze and plug the duct 2 channel when the molten material encounters the large heat sink of the blanket pellet upper region 5. As a contrast, relatively little freezing and consequent plugging would occur in the fission gas plenum 8 region because only a small heat sink exists there due to the cladding.

One approach to providing a fuel assembly with relatively low blocking potential would be to remove the upper axial blanket 5 altogether. However, the blanket 5 provides one of the main locations for breeding plutonium in the reactor and is the main neutron shield for permanent structures such as the upper internals above the top of the removable assemblies. Since it is undesirable to remove the blanket 5, according to this invention blanket 5 is to be redistributed axially so that its impact as a blockage promoter is not at a uniform elevation within the fuel assembly. This redistribution provides a path for escape of molten materials.

Figure 4:
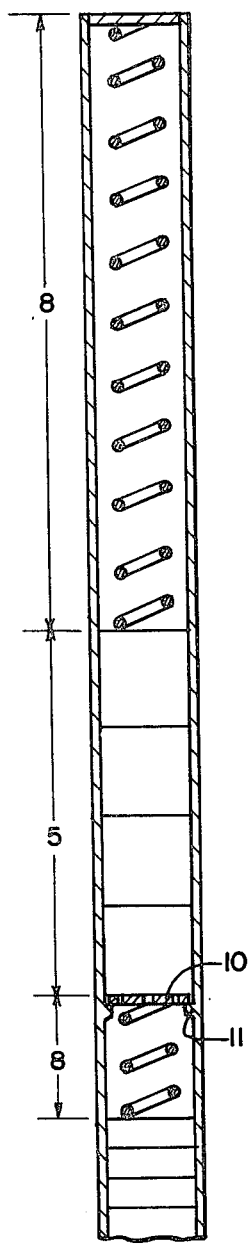
FIG. 4 is an embodiment taken as indicated from FIG. 2.
Figure 5:
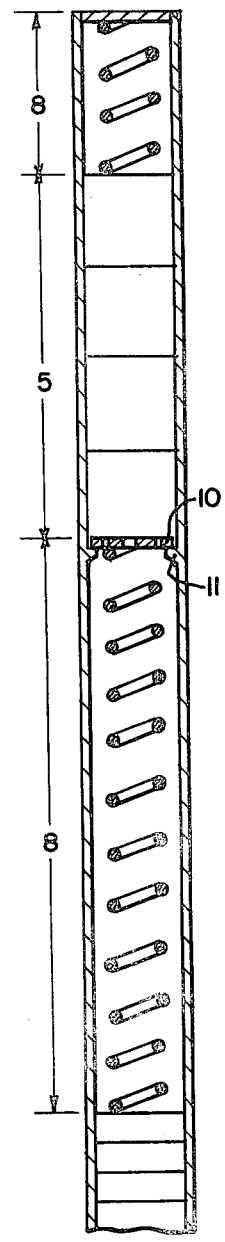
FIG. 5 is a second embodiment taken as indicated from FIG. 2.

Refer to FIG. 4. According to this invention there are to be at least two types of fuel rods 1. In both types, the fission gas plenum 8 is split into two regions by relocating the blanket pellet 13 stack 5. Relocation of the blanket pellet 13 stack 5 is accomplished with a support disc 10 and an internal ledge 11 or dimple in the fuel rod cladding 9. A second type of fuel rod 1 is illustrated in FIG. 5. The basic difference between the two types of fuel rods as illustrated by FIGS. 4 and 5 is the axial position of the blanket pellet 13 stack 5.

Figure 6:
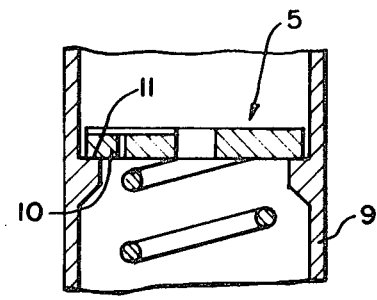
FIG. 6 is a detail taken from FIG. 4.
Figure 7:
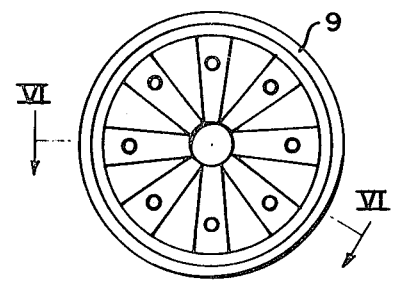
FIG. 7 is a section taken as indicated from FIG. 4.

FIG. 6 gives details of the ledge 11 and support disc 10 as does FIG. 7.

Figure 8:
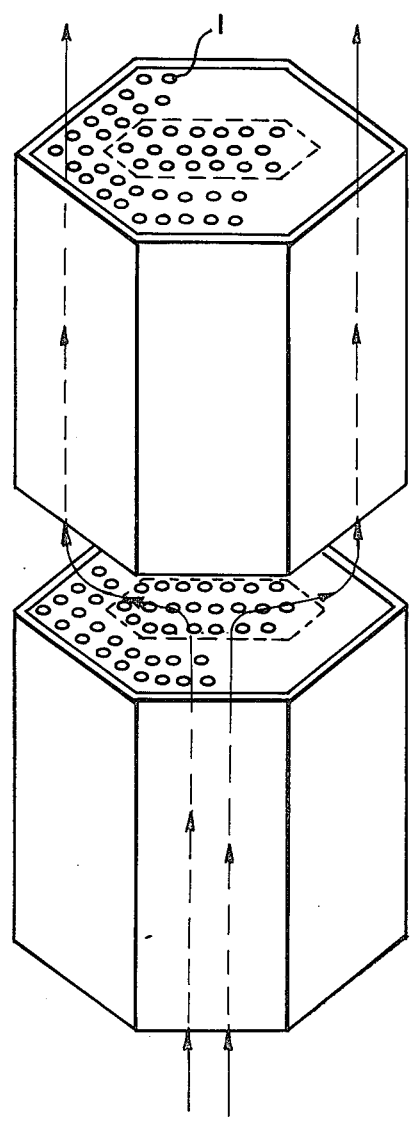
FIG. 8 is a schematic isometric of the invented fuel assembly.

The array of fuel rods 1 gathered together to form a fuel assembly is now to consist of at least two zones, each zone containing either type 1 fuel rods 1 as shown in FIG. 4 or type 2 fuel pins as shown in FIG. 5. The overall result is that the axial blanket 5 regions are not opposite one another at a common elevation. As shown in FIG. 8, a fuel dispersal flow path (arrows) exists which could be followed by molten material without ever encountering the heat sink presented by the blanket pellets.

Various modifications of this invention can be envisioned without departure from the true spirit and scope of the invention. For example, more than two types of fuel rods accomplishing the same purpose could easily be described. The fission gas plenum need not be split into two sections but could simply be decreased in size or increased in size as necessary. The geometric array of FIG. 8 establishing two zones could be modified to have more than two zones or to have zones of different geometric shape.

This embodiment has described a variation designed to permit molten fuel to be exhausted upwards out of the core region 4 and/or assembly to achieve subcriticality. Likewise the lower axial blanket 6 can be modified, by including some fission gas plenum 8 and/or changing appropriate lengths of blanket pellet 13 regions to permit downward removal of fuel from the original core region envelope, with the like result of reducing criticality.

We claim:

1. A fuel assembly arrangement for use with a liquid metal fast breeder reactor, said fuel assembly arrangement being operable to reduce the tendency to form blockages in the upper portions of said fuel assembly in a hypothetical core disruptive accident, said fuel assembly arrangement comprising:
   an array of elongated fuel rods retained in parallel and vertical orientation, spacer means between said fuel rods for maintaining therebetween a closely spaced relationship, a vertically disposed duct member surrounding said fuel rods and forming a confined path for liquid metal coolant flow upwardly through said duct member and between said closely spaced fuel rods;
   said elongated fuel rods being of a first design and a second different design, each of said fuel rod designs including an elongated surrounding cladding member having fertile material formed as lower blanket pellets disposed at a lower portion of said cladding member, and fissile fuel formed as pellets positioned above said lower blanket pellets;
   the first of said fuel rod designs having a relatively short fission gas plenum positioned above said fission fuel pellets, upper blanket pellets positioned above said short fission gas plenum, an elongated fission gas plenum positioned above said upper blanket pellets, and means for retaining said upper blanket pellets and said fission fuel pellets in position within said elongated cladding;
   the second of said fuel rod designs having a relatively long fission gas plenum positioned above said fission fuel pellets, upper blanket pellets positioned above said elongated fission gas plenum, and a relatively short fission gas plenum positioned above said upper blanket pellets, and means for retaining said upper blanket pellets and said fission fuel pellets in position within said elongated cladding;
   the positioning of said upper blanket pellets in said first fuel rod design and the positioning of said upper blanket pellets in said second fuel rod design bearing such relationship that all portions of said upper blanket pellets in said first fuel rod design are positioned substantially beneath all portions of said upper blanket pellets in said second fuel rod design; and
   said fuel rods as retained in said duct being arranged so that fuel rods of said second design are positioned about the central portion of said duct, and said fuel rods of said first design are positioned peripherally about said fuel rods of said second design; whereby a hypothetical core disruptive accident which results in blockage proximate said upper blanket portions of said fuel rods of said second design will cause coolant metal to flow through the upper portion of said surrounding fuel rods of said first design.

2. The fuel assembly as specified in claim 1, wherein said spacer means between said fuel rods comprises wire wrapped about each of said rods.

3. The fuel assembly as specified in claim 1, wherein said means for retaining said upper blanket pellets and said fission fuel pellets in position within said elongated cladding comprises an internal ledge having a disc supported thereon and positioned immediately beneath said upper blanket pellets, and said upper blanket pellets and said fission fuel pellets are retained in position by spring means.

* * * * *